United States Patent [19]

Grantz

[11] 4,138,320

[45] Feb. 6, 1979

[54] FLUIDIC SELF-ACTUATING CONTROL ASSEMBLY

[75] Inventor: Alan L. Grantz, Santa Clara, Calif.

[73] Assignee: The United States of America as represented by the United States Department of Energy, Washington, D.C.

[21] Appl. No.: 920,416

[22] Filed: Jun. 29, 1978

[51] Int. Cl.² ............................................. G21C 7/08
[52] U.S. Cl. .................................... 176/86 R; 176/22; 176/36 R; 176/DIG. 5
[58] Field of Search ................. 176/86 R, 36 R, 36 C, 176/36 SA, 22, DIG. 5, 35

[56] References Cited

U.S. PATENT DOCUMENTS

| | | | |
|---|---|---|---|
| 3,640,845 | 2/1972 | Ripley | 176/36 R |
| 3,793,141 | 2/1974 | Ball | 176/36 R |
| 3,900,365 | 8/1975 | Barclay et al. | 176/22 |
| 4,076,583 | 2/1978 | Ash et al. | 176/36 R |

Primary Examiner—Harvey E. Behrend
Attorney, Agent, or Firm—Dean E. Carlson; Roger S. Gaither; L. E. Carnahan

[57] ABSTRACT

A fluidic self-actuating control assembly for use in a reactor wherein no external control inputs are required to actuate (scram) the system. The assembly is constructed to scram upon sensing either a sudden depressurization of reactor inlet flow or a sudden increase in core neutron flux. A fluidic control system senses abnormal flow or neutron flux transients and actuates the system, whereupon assembly coolant flow reverses, forcing absorber balls into the reactor core region.

11 Claims, 4 Drawing Figures

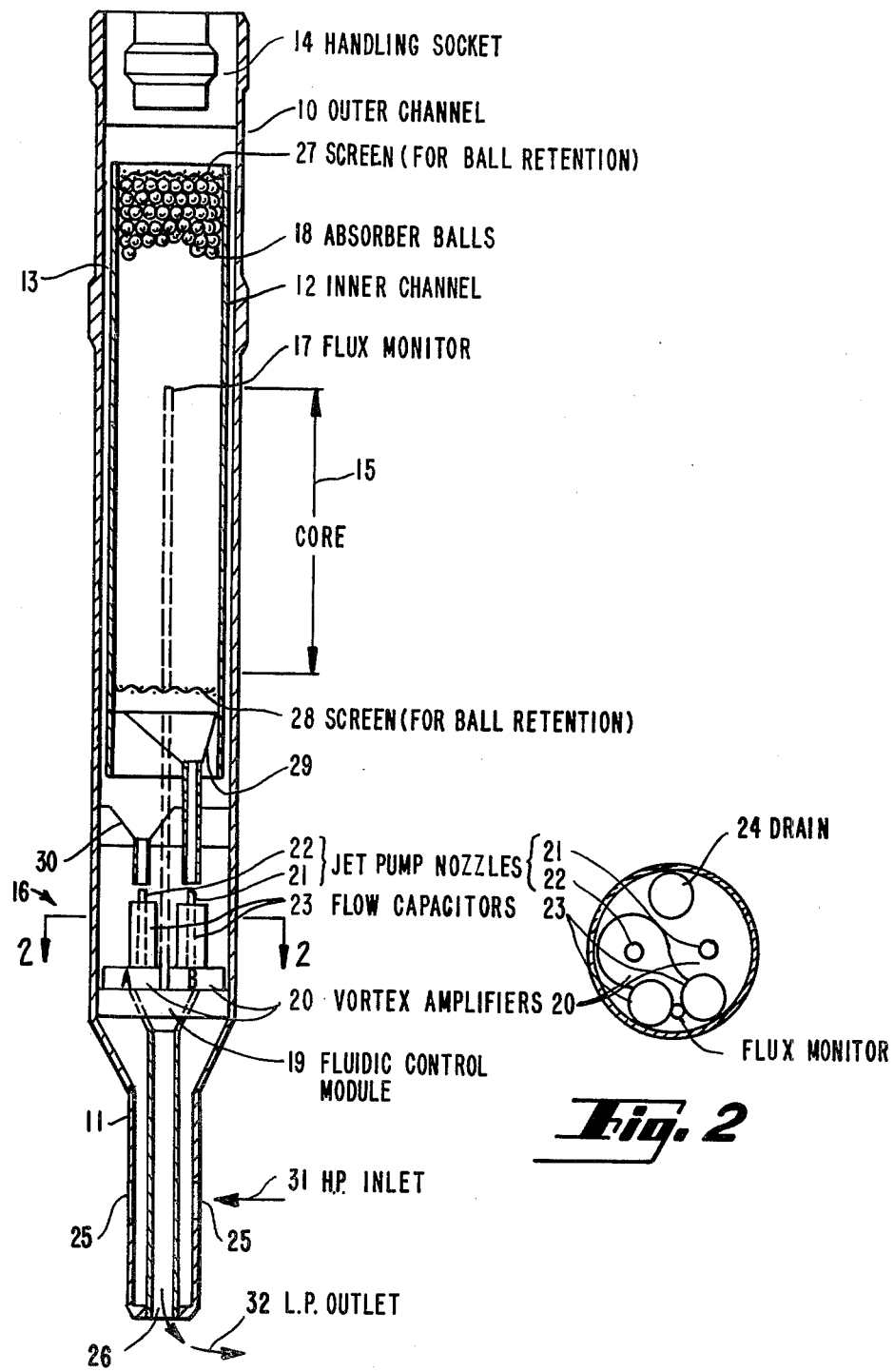

FLUIDIC SELF-ACTUATING CONTROL ASSEMBLY

BACKGROUND OF THE INVENTION

The invention described herein was made in the course of, or under, Contract No. E(04-3)-893, Task 19, with the U.S. Department of Energy.

The invention relates to control systems for a nuclear reactor, and more particularly to a fluidic self-actuating control assembly for use in the core of a liquid metal cooled reactor.

The use of control systems to regulate the reactivity of a nuclear reactor by varying the location of control rods with respect to the reactive core is well known. With a view toward the possibility of an emergency condition arising, as by an unexpected rise in reactivity, such control systems include arrangements for "scramming" the control rods; i.e., for rapid insert of the control rods into the reactive core to quickly shut down the reactor. U.S. Pats. No. 3,089,839 issued May 14, 1963; and No. 3,575,804 issued Apr. 20, 1971 exemplify prior art control rod scram systems.

With the advent of the liquid metal fast breeder reactor (LMFBR), a need for faster, less complex, more reliable control rod scram or shutdown systems has become apparent, whereby the reactivity of the reactor can be quickly shut down. Various efforts have been directed to a faster, more reliable control system as exemplified by U.S. Pat. Nos. 3,905,634 issued Sept. 16, 1975; 3,933,581 issued Jan. 20, 1976; 3,941,413 issued Mar. 2, 1976; and 3,980,519 issued Sept. 14, 1976.

Recently efforts have been directed to the desirability of utilizing LMFBR secondary or alternate control systems which would make an LMFBR inherently safe. The need is for a device or system which is not only self-actuating (no reliance on the reactor control system or operators) but which precludes the chance occurrence of common mode failures such as relative reactor vessel head and core differential motion, gross channel bowing distortion, channel crushing at the load pads, and external loops which can be used to bypass a scram intentionally. In addition, the needed device should be failsafe, reliable, testable in the core at shutdown, resetable and be capable of actuating upon sensing either the initiation of a transient undercooling (loss of flow) event or a transient overpower event.

Devices have been proposed which sense the reactor flow rate and would actuate when the reactor flow drops below a predetermined level. A more desirable feature, however, would be the capability of measuring the rate of change of either flow rate or flux level, which capability would result in a system with an inherent response time much faster than that of a system which would actuate upon sensing preset levels of flux or flow.

SUMMARY OF THE INVENTION

The present invention provides a control assembly or system which utilizes the above-mentioned desirable features; namely, measuring the rate of change of flow rate and flux level. The assembly functions to scram upon sensing either a sudden depressurization of reactor inlet flow or a sudden increase in core neutron flux. Thus, both transient undercooling and transient overpower events will result in control assembly actuation. The assembly employs a hydraulically supported neutron absorber ball (e.g. Ta, $Eu_2O_3$) concept, wherein a fluidic control system senses abnormal flow or neutron flux transients and actuates the assembly, whereupon assembly coolant flow reverses, forcing the absorber balls into the reactor core region.

Therefore, it is an object of the present invention to provide a fluidic self-actuating control assembly.

A further object of the invention is to provide a fluidic self-actuating control assembly which utilizes coolant flow to force neutron absorber balls into the core region.

Another object of the invention is to provide a control assembly for liquid metal cooled reactors which responds to either a change in coolant flow rate or in flux level.

Another object of the invention is to provide a fluidic self-actuating control assembly capable of actuation upon sensing either a sudden depressurization of reactor inlet flow or a sudden increase in core neutron flux.

Other objects of the invention will become readily apparent from the following description and accompanying drawings.

BRIEF DESCRIPTION OF THE DRAWINGS

FIG. 1 is a cross-sectional view of an embodiment of the invention;

FIG. 2 is a view taken along the lines 2—2 of FIG. 1;

DETAILED DESCRIPTION OF THE INVENTION

Figure 3:
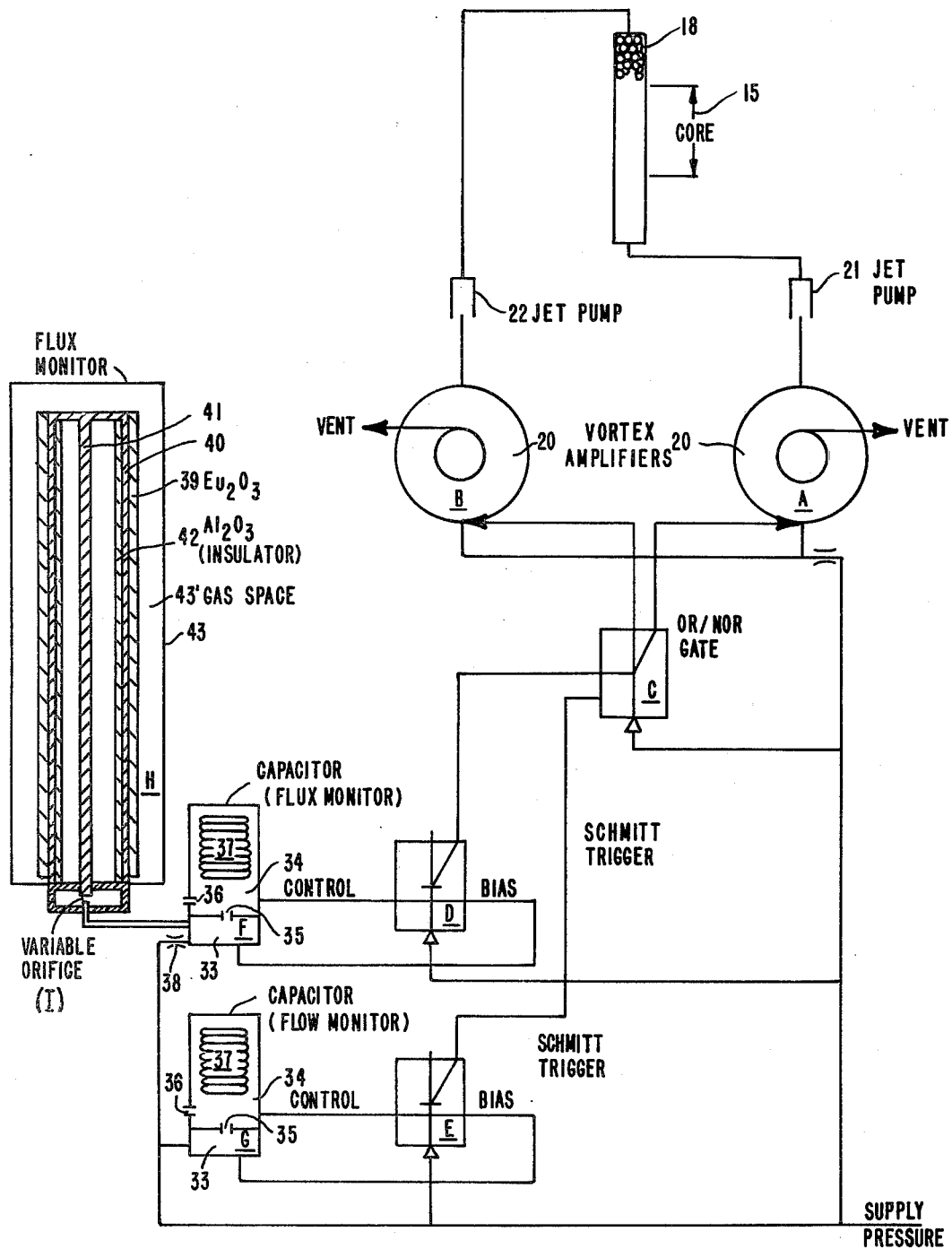
FIG. 3 schematically illustrates an embodiment of a fluidic control module of the FIG. 1 control assembly.

The invention involves a fluidic self-actuating control assembly particularly adapted for use in the core of a liquid metal fast breeder reactor (LMFBR). The control assembly is designed to self-actuate, i.e. no external control inputs are required to actuate (scram) the device. The assembly is designed to scram upon sensing either a sudden depressurization of reactor inlet flow or a sudden increase in core neutron flux. Thus, both transient under-cooling and transient over-power events will result in control assembly actuation. The assembly employs a hydraulically supported absorber ball (e.g. Ta, $Eu_2O_3$) concept. The fluidic control system senses abnormal flow or neutron flux transients and actuates the device, whereupon assembly coolant flow reverses, forcing the absorber balls into the reactor core region.

Thus, the control assembly of this invention is designed to actuate upon either a rapid change in core flow rate or a rapid increase in neutron flux level. It is sensitive to rates of change rather than absolute values of either flow rate or flux. The assembly, however, is fail-safe in that the absorber balls fall down into the core if the fluidic control system failed and the reactor flow dropped to some pre-set flow level (20–40% of nominal flow). Upon activation, the flow within the assembly rapidly reverses its direction, forcing the absorber balls into the core region.

A cross-sectional view of an embodiment of the fluidic self-actuating control assembly is illustrated in FIG. 1. As shown the the assembly basically comprises an outer channel or casing 10 having a reduced diameter lower section or nosepiece 11, and inner channel or tube 12 spaced within outer channel 10 so as to define an annulus 13 therebetween, a handling socket 14 secured within outer channel 10 for inserting the assembly into a reactor core region indicated at 15, as known in the art, fluid control means generally indicated at 16 located adjacent the reduced diameter section 11 of channel 10, a flux monitor 17 extending upwardly into inner channel 12, and absorber balls 18 within inner channel 12. As seen in FIGS. 1 and 2, the fluid control means 16 consists of a fluidic control module 19, vortex amplifiers 20A and 20B, jet pump nozzles 21 and 22 flow capacitors 23, and drain 24 operatively positioned with respect to a high pressure coolant or control fluid inlet nozzle 25 and low pressure fluid outlet nozzle 26 in reduced diameter section 11 of outer channel 10. Inner channel 12 is provided with a pair of screens 27 and 28 for retention of absorber balls 18, and a fluid inlet-drain mechanism 29, while a fluid inlet-drain mechanism 30 is secured within outer channel 10 below inner channel 12, and constructed such that mechanisms 29 and 30 are in alignment with jet nozzles 21 and 22, respectively.

The FIG. 1 embodiment of the control assembly operates in the following manner. High pressure coolant, such as sodium, indicated by arrow 31 enters the inlet nozzle 25 of nosepiece 11 and travels upward to the fluidic control module 19 and the vortex amplifiers 20. The vortex amplifiers (20A and 20B) are always in a state where one is open and the other is closed. The fluidic control module 19, sensing flow rate and/or flux changes, reverses the states of the vortex amplifiers when an actuating signal is received. In the normal operating mode, vortex amplifier 20A is open (low flow resistance) and 20B is closed (high flow resistance). Amplifier 20A sends a jet of high pressure sodium to the jet pump nozzle 21 directly above it, and sodium passes through inlet-drain mechanism 29 and enters the bottom of the inner channel 12. The sodium flows upwards through the lower ball retention screen 28, through the mass of absorber balls 18 (raising them to contact with the upper ball retention screen 27 and exits inner channel 12 through screen 27).

The sodium then flows downwards through annulus, inlet-drain mechanism 30, jet pump nozzle 22 into the drain 24, and travels down the outlet 26 nosepiece 11 to exit at the bottom of the assembly as indicated by arrows 32 into a reactor low pressure plenum. Upon actuating, the vortex amplifiers 20 reverse their respective states, and the sodium flows upward through the bypass region (jet pump nozzle 22, inlet-drain mechanism 30, annulus 13) and downward through screen 27 and inner channel 12. This downward flow drives the absorber balls 18 into the core region 15.

A schematic of the fluidic control module 19 and associated assembly components, as shown in FIG. 3, illustrates the system logic. The vortex amplifiers 20 (A,B) are switched by an OR/NOR gate (C). In its NOR state, gate (C) sends a control signal to amplifier (B) increasing the flow resistance in (B). Since no control signal is sent to amplifier (A), the resistance of (A) is much less than that of (B) and, consequently, (A) pressurizes the bottom of the inlet channel, sending flow upwardly through the jet pump 21 and supporting the absorber balls 18 above the core 15. When gate (C) receives a signal from either Schmitt trigger (D) or (E) or both, it switches the control signal to amplifier (A) and removes it from (B), which causes a rapid flow reversal within the assembly and drives the absorber balls 18 into the core 15, as above-described. The Schmitt triggers (D) and (E) are switched by depressurization of the flow capacitors (F,G), indicated at 23 in FIG. 1. The Schmitt triggers are actuated (positive output to the OR/NOR gate) whenever the control pressure exceeds the bias pressure of a capacitor. These pressures are outputs of the flow capacitors.

Flow capacitor (G) having a lower plenum 33, upper plenum 34 and connecting orifice 35 is used for sensing flow rate changes and works as follows: As the reactor coolant flow is increased during start-up, the lower plenum 33 of the capacitor pressurizes and remains at a higher pressure than the upper plenum 34 while the flow is being increased. The orifice 35 connecting the two plenums prevents a rapid buildup of pressure in the upper plenum. As steady state operation is approached, the pressures in the two plenums reach equilibrium values. A small orifice 36 allowing flow to exit the upper plenum, insures that flow will continue from the lower plenum through the interconnecting orifice. The pressure drop across the interconnecting orifice results in a steady state pressure differential between the two plenums, and insures that the bias pressure to the Schmitt trigger (E) will be greater than the control pressure. Upon a sudden change in reactor flow rate, the supply pressure suddenly drops causing the lower plenum pressure to drop rapidly. A gas accumulator (gas in a sealed bellows) 37 in the upper plenum of the flow capacitor, in conjunction with the interconnecting orifice retains the pressure in the upper plenum so that the control pressure exceeds the bias pressure on Schmitt trigger (E). When this occurs, the Schmitt trigger (E) is switched.

The flow capacitor (F) for the flux monitor (H), indicated at 17 in FIG. 1, constructed similarly to capacitor (G), works as follows: Flow from the supply line enters the lower plenum of the flow capacitor after passing through an orifice 38. The lower plenum 37 is vented through a variable orifice (I) in the flux monitor (H). When the flux monitor senses a rapid increase in flux, its variable orifice (I) opens causing the lower plenum of the flow capacitor (F) to depressurize. This switches the Schmitt trigger (D).

The flux monitor (H) employs a nuclear heating element 39 (such as $Eu_2O_3$ or Ta) to detect rapid increases in the flux level. The structural components of the flux monitor (H) consists of a thin steel tube or cylinder (wall thickness of 0.015 in. to 0.020 in.) 40 connected concentrically to thick steel rod 41 (diameter of 0.20 in. to 0.30 in.). Components 40 and 41 are separated radially by an insulator 42 constructed of $Al_2O_3$ or an inert gas such as He, for example. The steel tube is covered on the exterior surface thereof with the nuclear heating material 39 (material thickness of 0.10 in. to 0.15 in.) and the entire device (components 39–42) is located within a casing 43 and encapsulated in an inert gas atmosphere 43′, such as He or Ar. The components 40 and 41, may also be constructed of Inconel. During steady state operating, the two steel components 40 and 41 are at the same temperature. When the flux rises rapidly, the outer cylinder 40 (with low heat capacity) undergoes a rapid increase in temperature while the inner rod 41 (with high heat capacity), which is insulated, remains at near constant temperature. The resulting differential thermal expansion causes the variable orifice (I) to open and thereby reduces the pressure in the lower plenum of the flow capacitor (F).

The flux monitor (H) is relatively insensitive to changes in length or configuration, as long as these changes occur slowly. A gradual opening or closing of the orifice (I) will only result in a new reference bias pressure in the flow capacitor (F).

Figure 4:
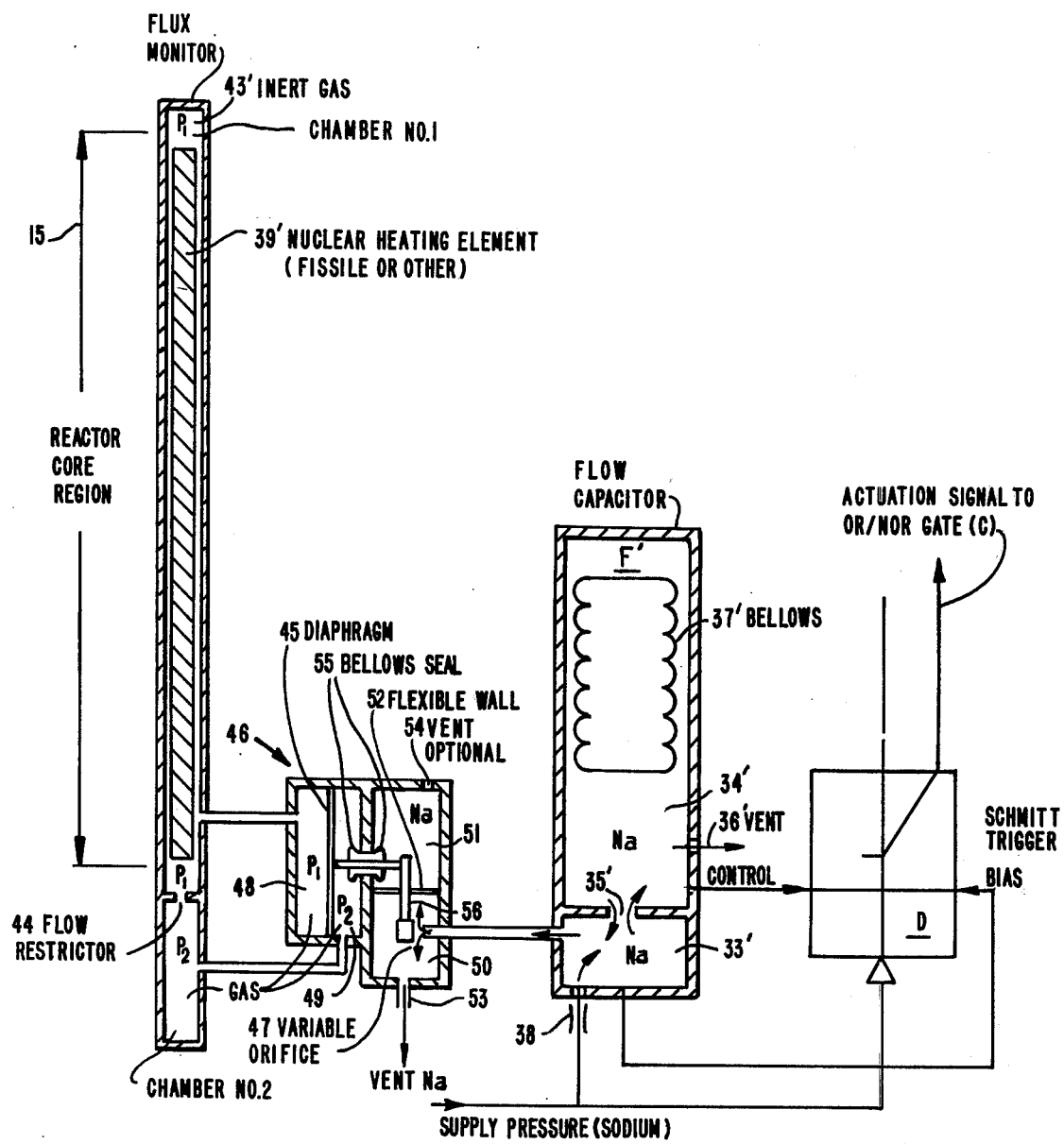
FIG. 4 is a partial schematic 1 cross-sectional view of a gas expansion flux monitor as an alternate to the flux monitor of the FIG. 3 embodiment.

An alternate flux monitor, utilizing gas expansion rather than metal expansion, is illustrated in FIG. 4, and similar components are given corresponding reference numerals to those of the FIG. 3 embodiment. The advantage of the gas expansion approach over the steel expansion approach is the inherently faster response time of the gas device due to the reduced heat capacity of the gas as compared to steel. A further advantage appears to be the capability of making the gas expansion device smaller in diameter than the metal expansion device.

The FIG. 4 embodiment works as follows: During steady state operation, the pressure ($P_1$) in chamber #1 for the flux monitor equals the pressure ($P_2$) in chamber #2. Pressure equalization between chambers occurs as gas flows (slowly) through a flow restrictor 44. Upon sensing a rapid increase in flux, the temperature and, hence, the gas pressure rapidly increases in chamber #1 and slowly increases in chamber #2 (the difference in rates of change is due to the flow restrictor 44). The resulting differential pressure ($P_1 > P_2$) moves a diaphragm 45 in pressure responsive mechanism 46, opening a variable orifice 47 thereby venting the lower plenum 33' in the attached flow capacitor (F') (similar to capacitor F of FIG. 3). As the lower plenum 33' of the flow capacitor is vented, the fluidic switching signal is generated causing Schmitt trigger (D) to switch.

Pressure responsive mechanism 46 is provided with four chambers 48, 49, 50, and 51, with diaphragm 45 positioned intermediate chambers 48 and 49, and with a flexible wall 52 separating chambers 50 and 51. Variable orifice 47 is located within chamber 50, while chambers 50 and 51 are provided with vents 53 and 54, vent 54 being optional. Variable orifice 47 is activated by diaphragm 45 via dual bellows seals 55 and an arm 56 mounted on flexible wall 52.

It should be noted that a rupture of bellows seals 55 would result in a scram. The flux monitor would be initially pressurized to a pressure greater than the sodium vent pressure. Upon rupture of the dual bellows, the pressure in chamber #2 would drop to vent pressure and the device would actuate due to the pressure $P_1$ on diaphragm 45 being higher.

One of the desirable features of the control assembly of this invention is that it can be tested at shutdown and reset at startup. Testing of the flow rate sensor consists of suddenly reducing the reactor flow by a small amount and measuring the reactivity change as the absorber balls are inserted. The flux monitor can be tested by incorporating an electric heating element in the sensor. Electromagnetic induction coupling in the top of the assembly could be used to supply an electric current to the heater and actuate the device, and such a coupling could be part of the reactor instrument tree.

Fluidic control reset is performed automatically whenever the reactor is started up. This automatic restart capability eliminates the need for any vessel head penetrations and mechanisms to interface with the control assembly.

It is thus seen that the invention provides a fluidic self-actuating control assembly having the capability of measuring the rate of change of either flow rate or flux level and designed to scram upon sensing either a sudden depressurization of reactor inlet flow or a sudden increase in core neutron flux. Thus, both transient under-cooling and transient over-power events will result in control assembly actuation.

While particular embodiments of the invention have been illustrated and/or described, modifications will become apparent to those skilled in the art, and it is intended to cover in the appended claims all such modifications as come within the spirit and scope of the invention.

What I claim is

1. A control assembly for a reactor responsive to a sudden change of fluid flow rate and/or neutron flux level comprising: an outer channel and an inner channel defining an annulus therebetween, said outer channel having fluid inlet means and fluid outlet means, said inner channel containing neutron absorber material and positioned within said outer channel so as to be partially within an associated reactor core, fluidic means located within said outer channel intermediate said inner channel and said fluid inlet and outlet means, said fluidic means including means responsive to fluid inlet pressure for directing under normal operating conditions fluid from said inlet means into a first portion of said inner channel forcing said neutron absorber material into a second portion of said inner channel, said fluidic means also including means responsive to a sudden decrease in fluid inlet pressure for directing fluid from said inlet means into said second portion of said inner channel allowing said neutron absorber material to move into said first portion of said inner channel, flux monitor means positioned so as to extend into said first portion of said inner channel, and means responsive to a rapid increase in neutron flux for directing fluid from said inlet means into said second portion of said inner channel allowing said neutron absorber material to move into said first portion of said inner channel.

2. The control assembly defined in claim 1, wherein said neutron absorber material consists of absorber balls retained within said inner channel by a pair of spaced retention screens.

3. The control assembly defined in claim 1, wherein said outer channel is provided with a reduced diameter nosepiece within which said fluid inlet and outlet means are located, said fluid outlet means being centrally located within said fluid inlet means.

4. The control assembly defined in claim 1, wherein said fluidic means includes a pair of vortex amplifiers, means for selectively activating said vortex amplifiers such that when one is closed the other is open, and a pair of jet pumps operatively associated with said vortex amplifiers, one of said jet pumps being positioned to direct fluid into said first portion of said inner channel, and the other of said jet pumps being positioned to direct fluid into said second portion of said inner channel.

5. The control assembly defined in claim 4, wherein said means for selectively activating said vortex amplifiers includes a pair of flow capacitors, a pair of Schmitt trigger assemblies operatively connected to said flow capacitors, and an OR/NOR gate operatively connected intermediate said Schmitt trigger assemblies and said vortex amplifiers, one of said flow capacitors being responsive to a rapid decrease in fluid flow, and the other of said flow capacitors being responsive to said means responsive to a rapid increase in neutron flux of said flux monitor means.

6. The control assembly defined in claim 5, wherein said means responsive to a rapid increase in neutron flux consists of a variable orifice positioned intermediate said flux monitor means and said other of said flow capacitors.

7. The control assembly defined in claim 1, wherein said flux monitor means is a metallic differential thermal expansion type.

8. The control assembly defined in claims 1 or 6, wherein said flux monitor means consists of a casing having therein a metal rod, a cylindrical metal member positioned in a radially spaced relation with respect to said metal rod, an insulator positioned intermediate said rod and said member, a layer of nuclear heating material on the outer surface of said cylindrical member, and an inert gas atmosphere about said material whereby, rapid increase in neutron flux causes a rapid increase in temperature of said cylindrical member compared to said rod resulting in differential thermal expansion causing activation of said means responsive to a rapid increase in neutron flux.

9. The control assembly defined in claim 1, wherein said flux monitor means is of a pressure differential type.

10. The control assembly defined in claim 9, wherein said flux monitor means consists of a housing having a pair of chambers therein separated by a flow restrictive orifice, nuclear heating material being contained in one of said pair of chambers, and additionally including pressure responsive means operatively connected with each of said chambers for activating said means responsive to a rapid increase in neutron flux.

11. The control assembly defined in claims 1 or 6, wherein said flux monitor means consists of a casing having therein a pair of chambers separated by a flow restrictive orifice, one of said chambers containing nuclear heating material, and a differential pressure responsive means having a plurality of chambers therein, a first of said chambers of said differential pressure responsive means being in open communication with said one of said casing chambers, a second of said chambers of said differential pressure responsive means being in open communication with the other of said pair of casing chambers, diaphragm means positioned intermediate said first and second chambers, said means responsive to a rapid increase in neutron flux constituting a variable orifice located in a third chamber of said differential pressure responsive means, and means operatively connected to said diaphragm means for activating said variable orifice, whereby an increase in neutron flux causes a differential in pressure across said diaphragm means causing movement thereof and activation of said variable orifice.

* * * * *